(12) United States Patent
Yamaguchi

(10) Patent No.: US 6,687,376 B1
(45) Date of Patent: Feb. 3, 2004

(54) HIGH-SPEED LONG CODE GENERATION WITH ARBITRARY DELAY

(75) Inventor: Hirohisa Yamaguchi, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/222,445

(22) Filed: Dec. 29, 1998

(51) Int. Cl.[7] .............................. H04L 9/28; H04L 9/00
(52) U.S. Cl. ............................. 380/46; 380/44; 380/263; 713/174
(58) Field of Search ................................ 380/1, 28, 33, 380/49, 246

(56) References Cited

U.S. PATENT DOCUMENTS

| | | | | |
|---|---|---|---|---|
| 4,052,565 A | * | 10/1977 | Baxter et al. | 380/33 |
| 4,797,921 A | * | 1/1989 | Shiraishi | 380/28 |
| 4,847,861 A | * | 7/1989 | Hamatsu et al. | 380/49 |
| 5,177,786 A | * | 1/1993 | Kang | 380/49 |
| 5,228,054 A | | 7/1993 | Rueth et al. | 375/1 |
| 5,295,188 A | * | 3/1994 | Wilson et al. | 380/30 |
| 5,297,207 A | * | 3/1994 | Degele | 380/49 |
| 5,375,169 A | * | 12/1994 | Seheidt et al. | 380/21 |
| 5,600,720 A | * | 2/1997 | Iwamura et al. | 380/21 |
| 5,608,802 A | * | 3/1997 | Alvarez Alvarez | 380/28 |
| 5,659,569 A | * | 8/1997 | Padovani et al. | 380/28 |
| 5,995,533 A | * | 11/1999 | Hassan et al. | 380/28 |

OTHER PUBLICATIONS

"Reports on FPLMTS Radio Transmission Technology Special Group", (Round 2 Activity Report), Association of Radio Industries and Business (ARIB), FPLMTS Study Committee, Draft Version E1.1, Jan. 20, 1997, 112 sheets (front/back).

"Proposed Wideband CDMA (W–CDMA)", Association of Radio Industries and Businesses (ARIB), Japan, Jan. 1997, 206 sheets (front/back).

* cited by examiner

Primary Examiner—Gilberto Barrón
Assistant Examiner—Kambiz Zand
(74) Attorney, Agent, or Firm—Carlton H. Hoel; W. James Brady; Frederick J. Telecky, Jr..

(57) ABSTRACT

A circuit is designed with a first register circuit (364) arranged to store a state matrix. A memory circuit (710) is arranged to store a plurality of addressable matrices. A control circuit (700) is coupled to receive a delay value and a clock signal. The control circuit is arranged to address a selected matrix from the plurality of addressable matrices in response to the delay value and the clock signal. A backward register circuit (420) is coupled (712) to receive the selected matrix. The backward register circuit is arranged to produce a plurality of shifted matrices from the selected matrix in response to the clock signal. A logic circuit (330–354) is coupled to receive the state matrix, the selected matrix and the plurality of shifted matrices. The logic circuit produces a logical combination of the state matrix and each of the selected matrix and the plurality of shifted matrices.

20 Claims, 7 Drawing Sheets

```
                    1 2                       4
0                   9 0                       0    ROW
0 1 0 0 0 0 0 0 0 0 0 0 0 0 0 0 0 0 0 0 0 0 0 0 0 0 0 0 0 0 0 0 0 0 0 0 0 0 0 0    0
0 0 1 0 0 0 0 0 0 0 0 0 0 0 0 0 0 0 0 0 0 0 0 0 0 0 0 0 0 0 0 0 0 0 0 0 0 0 0 0    1
0 0 0 1 0 0 0 0 0 0 0 0 0 0 0 0 0 0 0 0 0 0 0 0 0 0 0 0 0 0 0 0 0 0 0 0 0 0 0 0    2
0 0 0 0 1 0 0 0 0 0 0 0 0 0 0 0 0 0 0 0 0 0 0 0 0 0 0 0 0 0 0 0 0 0 0 0 0 0 0 0    3
0 0 0 0 0 1 0 0 0 0 0 0 0 0 0 0 0 0 0 0 0 0 0 0 0 0 0 0 0 0 0 0 0 0 0 0 0 0 0 0    4
0 0 0 0 0 0 1 0 0 0 0 0 0 0 0 0 0 0 0 0 0 0 0 0 0 0 0 0 0 0 0 0 0 0 0 0 0 0 0 0    5
0 0 0 0 0 0 0 1 0 0 0 0 0 0 0 0 0 0 0 0 0 0 0 0 0 0 0 0 0 0 0 0 0 0 0 0 0 0 0 0    6
0 0 0 0 0 0 0 0 1 0 0 0 0 0 0 0 0 0 0 0 0 0 0 0 0 0 0 0 0 0 0 0 0 0 0 0 0 0 0 0    7
0 0 0 0 0 0 0 0 0 1 0 0 0 0 0 0 0 0 0 0 0 0 0 0 0 0 0 0 0 0 0 0 0 0 0 0 0 0 0 0    8
0 0 0 0 0 0 0 0 0 0 1 0 0 0 0 0 0 0 0 0 0 0 0 0 0 0 0 0 0 0 0 0 0 0 0 0 0 0 0 0    9
0 0 0 0 0 0 0 0 0 0 0 1 0 0 0 0 0 0 0 0 0 0 0 0 0 0 0 0 0 0 0 0 0 0 0 0 0 0 0 0    10
0 0 0 0 0 0 0 0 0 0 0 0 1 0 0 0 0 0 0 0 0 0 0 0 0 0 0 0 0 0 0 0 0 0 0 0 0 0 0 0    11
0 0 0 0 0 0 0 0 0 0 0 0 0 1 0 0 0 0 0 0 0 0 0 0 0 0 0 0 0 0 0 0 0 0 0 0 0 0 0 0    12
0 0 0 0 0 0 0 0 0 0 0 0 0 0 1 0 0 0 0 0 0 0 0 0 0 0 0 0 0 0 0 0 0 0 0 0 0 0 0 0    13
0 0 0 0 0 0 0 0 0 0 0 0 0 0 0 1 0 0 0 0 0 0 0 0 0 0 0 0 0 0 0 0 0 0 0 0 0 0 0 0    14
0 0 0 0 0 0 0 0 0 0 0 0 0 0 0 0 1 0 0 0 0 0 0 0 0 0 0 0 0 0 0 0 0 0 0 0 0 0 0 0    15
0 0 0 0 0 0 0 0 0 0 0 0 0 0 0 0 0 1 0 0 0 0 0 0 0 0 0 0 0 0 0 0 0 0 0 0 0 0 0 0    16
0 0 0 0 0 0 0 0 0 0 0 0 0 0 0 0 0 0 1 0 0 0 0 0 0 0 0 0 0 0 0 0 0 0 0 0 0 0 0 0    17
0 0 0 0 0 0 0 0 0 0 0 0 0 0 0 0 0 0 0 1 0 0 0 0 0 0 0 0 0 0 0 0 0 0 0 0 0 0 0 0    18
0 0 0 0 0 0 0 0 0 0 0 0 0 0 0 0 0 0 0 0 1 0 0 0 0 0 0 0 0 0 0 0 0 0 0 0 0 0 0 0    19
0 0 0 0 0 0 0 0 0 0 0 0 0 0 0 0 0 0 0 0 0 1 0 0 0 0 0 0 0 0 0 0 0 0 0 0 0 0 0 0    20
0 0 0 0 0 0 0 0 0 0 0 0 0 0 0 0 0 0 0 0 0 0 1 0 0 0 0 0 0 0 0 0 0 0 0 0 0 0 0 0    21
0 0 0 0 0 0 0 0 0 0 0 0 0 0 0 0 0 0 0 0 0 0 0 1 0 0 0 0 0 0 0 0 0 0 0 0 0 0 0 0    22
0 0 0 0 0 0 0 0 0 0 0 0 0 0 0 0 0 0 0 0 0 0 0 0 1 0 0 0 0 0 0 0 0 0 0 0 0 0 0 0    23
0 0 0 0 0 0 0 0 0 0 0 0 0 0 0 0 0 0 0 0 0 0 0 0 0 1 0 0 0 0 0 0 0 0 0 0 0 0 0 0    24
0 0 0 0 0 0 0 0 0 0 0 0 0 0 0 0 0 0 0 0 0 0 0 0 0 0 1 0 0 0 0 0 0 0 0 0 0 0 0 0    25
0 0 0 0 0 0 0 0 0 0 0 0 0 0 0 0 0 0 0 0 0 0 0 0 0 0 0 1 0 0 0 0 0 0 0 0 0 0 0 0    26
0 0 0 0 0 0 0 0 0 0 0 0 0 0 0 0 0 0 0 0 0 0 0 0 0 0 0 0 1 0 0 0 0 0 0 0 0 0 0 0    27
0 0 0 0 0 0 0 0 0 0 0 0 0 0 0 0 0 0 0 0 0 0 0 0 0 0 0 0 0 1 0 0 0 0 0 0 0 0 0 0    28
0 0 0 0 0 0 0 0 0 0 0 0 0 0 0 0 0 0 0 0 0 0 0 0 0 0 0 0 0 0 1 0 0 0 0 0 0 0 0 0    29
0 0 0 0 0 0 0 0 0 0 0 0 0 0 0 0 0 0 0 0 0 0 0 0 0 0 0 0 0 0 0 1 0 0 0 0 0 0 0 0    30
0 0 0 0 0 0 0 0 0 0 0 0 0 0 0 0 0 0 0 0 0 0 0 0 0 0 0 0 0 0 0 0 1 0 0 0 0 0 0 0    31
0 0 0 0 0 0 0 0 0 0 0 0 0 0 0 0 0 0 0 0 0 0 0 0 0 0 0 0 0 0 0 0 0 1 0 0 0 0 0 0    32
0 0 0 0 0 0 0 0 0 0 0 0 0 0 0 0 0 0 0 0 0 0 0 0 0 0 0 0 0 0 0 0 0 0 1 0 0 0 0 0    33
0 0 0 0 0 0 0 0 0 0 0 0 0 0 0 0 0 0 0 0 0 0 0 0 0 0 0 0 0 0 0 0 0 0 0 1 0 0 0 0    34
0 0 0 0 0 0 0 0 0 0 0 0 0 0 0 0 0 0 0 0 0 0 0 0 0 0 0 0 0 0 0 0 0 0 0 0 1 0 0 0    35
0 0 0 0 0 0 0 0 0 0 0 0 0 0 0 0 0 0 0 0 0 0 0 0 0 0 0 0 0 0 0 0 0 0 0 0 0 1 0 0    36
0 0 0 0 0 0 0 0 0 0 0 0 0 0 0 0 0 0 0 0 0 0 0 0 0 0 0 0 0 0 0 0 0 0 0 0 0 0 1 0    37
0 0 0 0 0 0 0 0 0 0 0 0 0 0 0 0 0 0 0 0 0 0 0 0 0 0 0 0 0 0 0 0 0 0 0 0 0 0 0 1    38
0 0 0 0 0 0 0 0 0 0 0 0 0 0 0 0 0 0 0 0 0 0 0 0 0 0 0 0 0 0 0 0 0 0 0 0 0 0 0 1    39
1 0 0 0 0 0 0 0 0 0 0 0 0 0 0 0 0 0 0 0 1 0 0 0 0 0 0 0 0 0 0 0 0 0 0 0 0 0 0 0    40
```

*FIG. 5A*

```
                    1 2                              4
0                   9 0                              0  ROW
0 0 0 0 0 0 0 0 0 0 0 0 1 0 0 0 1 1 0 1 0 0 0 1 0 0 0 0 0 0 0 1 1 0 1 1 0 0 1   0
1 0 0 0 0 0 0 0 0 0 0 0 1 0 0 0 0 1 1 1 1 0 0 0 1 0 0 0 0 0 0 0 1 1 0 1 1 0 0   1
0 1 0 0 0 0 0 0 0 0 0 0 0 1 0 0 0 0 1 1 1 1 0 0 0 1 0 0 0 0 0 0 0 1 1 0 1 1 0   2
0 0 1 0 0 0 0 0 0 0 0 0 0 0 1 0 0 0 0 1 1 1 1 0 0 0 1 0 0 0 0 0 0 0 1 1 0 1 1   3
1 0 0 1 0 0 0 0 0 0 0 0 0 0 0 1 0 0 0 0 1 1 1 1 0 0 0 1 0 0 0 0 0 0 0 1 1 0 1   4
1 1 0 0 1 0 0 0 0 0 0 0 0 0 0 0 1 0 0 1 1 1 1 1 0 0 0 1 0 0 0 0 0 0 0 0 1 1 0   5
0 1 1 0 0 1 0 0 0 0 0 0 0 0 0 0 0 1 0 0 1 1 1 1 1 0 0 0 1 0 0 0 0 0 0 0 0 1 1   6
1 0 1 1 0 0 1 0 0 0 0 0 0 0 0 0 0 0 1 1 0 1 1 1 1 1 0 0 0 1 0 0 0 0 0 0 0 0 1   7
1 1 0 1 1 0 0 1 0 0 0 0 0 0 0 0 0 0 0 0 1 0 1 1 1 1 1 0 0 0 1 0 0 0 0 0 0 0 0   8
0 1 1 0 1 1 0 0 1 0 0 0 0 0 0 0 0 0 0 0 0 1 0 1 1 1 1 1 0 0 0 1 0 0 0 0 0 0 0   9
0 0 1 1 0 1 1 0 0 1 0 0 0 0 0 0 0 0 0 0 0 0 1 0 1 1 1 1 1 0 0 0 1 0 0 0 0 0 0  10
0 0 0 1 1 0 1 1 0 0 1 0 0 0 0 0 0 0 0 0 0 0 0 1 0 1 1 1 1 1 0 0 0 1 0 0 0 0 0  11
0 0 0 0 1 1 0 1 1 0 0 1 0 0 0 0 0 0 0 0 0 0 0 0 1 0 1 1 1 1 1 0 0 0 1 0 0 0 0  12
0 0 0 0 0 1 1 0 1 1 0 0 1 0 0 0 0 0 0 0 0 0 0 0 0 1 0 1 1 1 1 1 0 0 0 1 0 0 0  13
0 0 0 0 0 0 1 1 0 1 1 0 0 1 0 0 0 0 0 0 0 0 0 0 0 0 1 0 1 1 1 1 1 0 0 0 1 0 0  14
0 0 0 0 0 0 0 1 1 0 1 1 0 0 1 0 0 0 0 0 0 0 0 0 0 0 0 1 0 1 1 1 1 1 0 0 0 1 0  15
0 0 0 0 0 0 0 0 1 1 0 1 1 0 0 1 0 0 0 0 0 0 0 0 0 0 0 0 1 0 1 1 1 1 1 0 0 0 1  16
1 0 0 0 0 0 0 0 0 1 1 0 1 1 0 0 1 0 0 0 1 0 0 0 0 0 0 0 0 1 0 1 1 1 1 1 0 0 0  17
0 1 0 0 0 0 0 0 0 0 1 1 0 1 1 0 0 1 0 0 0 1 0 0 0 0 0 0 0 0 1 0 1 1 1 1 1 0 0  18
0 0 1 0 0 0 0 0 0 0 0 1 1 0 1 1 0 0 1 0 0 0 1 0 0 0 0 0 0 0 0 1 0 1 1 1 1 1 0  19
0 0 0 1 0 0 0 0 0 0 0 0 1 1 0 1 1 0 0 1 0 0 0 1 0 0 0 0 0 0 0 0 1 0 1 1 1 1 1  20
1 0 0 0 1 0 0 0 0 0 0 0 0 1 1 0 1 1 0 0 0 0 0 0 1 0 0 0 0 0 0 0 0 1 0 1 1 1 1  21
1 1 0 0 0 1 0 0 0 0 0 0 0 0 1 1 0 1 1 0 1 0 0 0 0 1 0 0 0 0 0 0 0 0 1 0 1 1 1  22
1 1 1 0 0 0 1 0 0 0 0 0 0 0 0 1 1 0 1 1 1 1 0 0 0 0 1 0 0 0 0 0 0 0 0 1 0 1 1  23
1 1 1 1 0 0 0 1 0 0 0 0 0 0 0 0 1 1 0 1 0 1 1 0 0 0 0 1 0 0 0 0 0 0 0 0 1 0 1  24
1 1 1 1 1 0 0 0 1 0 0 0 0 0 0 0 0 1 1 0 0 0 1 1 0 0 0 0 1 0 0 0 0 0 0 0 0 1 0  25
1 1 1 1 1 1 0 0 0 1 0 0 0 0 0 0 0 0 1 1 1 0 0 1 1 0 0 0 0 1 0 0 0 0 0 0 0 0 1  26
0 1 1 1 1 1 1 0 0 0 1 0 0 0 0 0 0 0 0 1 1 1 0 0 1 1 0 0 0 0 1 0 0 0 0 0 0 0 0  27
1 0 1 1 1 1 1 1 0 0 0 1 0 0 0 0 0 0 0 0 1 1 1 0 0 1 1 0 0 0 0 1 0 0 0 0 0 0 0  28
0 1 0 1 1 1 1 1 1 0 0 0 1 0 0 0 0 0 0 0 0 1 1 1 0 0 1 1 0 0 0 0 1 0 0 0 0 0 0  29
0 0 1 0 1 1 1 1 1 1 0 0 0 1 0 0 0 0 0 0 0 0 1 1 1 0 0 1 1 0 0 0 0 1 0 0 0 0 0  30
0 0 0 1 0 1 1 1 1 1 1 0 0 0 1 0 0 0 0 0 0 0 0 1 1 1 0 0 1 1 0 0 0 0 1 0 0 0 0  31
0 0 0 0 1 0 1 1 1 1 1 1 0 0 0 1 0 0 0 0 0 0 0 0 1 1 1 0 0 1 1 0 0 0 0 1 0 0 0  32
0 0 0 0 0 1 0 1 1 1 1 1 1 0 0 0 1 0 0 0 0 0 0 0 0 1 1 1 0 0 1 1 0 0 0 0 1 0 0  33
0 0 0 0 0 0 1 0 1 1 1 1 1 1 0 0 0 1 0 0 0 0 0 0 0 0 1 1 1 0 0 1 1 0 0 0 0 1 0  34
0 0 0 0 0 0 0 1 0 1 1 1 1 1 1 0 0 0 1 0 0 0 0 0 0 0 0 1 1 1 0 0 1 1 0 0 0 0 1  35
0 0 0 0 0 0 0 0 1 0 1 1 1 1 1 1 0 0 0 1 0 0 0 0 0 0 0 0 1 1 1 0 0 1 1 0 0 0 0  36
0 0 0 0 0 0 0 0 0 1 0 1 1 1 1 1 1 0 0 0 1 0 0 0 0 0 0 0 0 1 1 1 0 0 1 1 0 0 0  37
1 0 0 0 0 0 0 0 0 0 1 0 1 1 1 1 1 1 0 0 1 1 0 0 0 0 0 0 0 0 1 1 1 0 0 1 1 0 0  38
0 1 0 0 0 0 0 0 0 0 0 1 0 1 1 1 1 1 1 0 0 1 1 0 0 0 0 0 0 0 0 1 1 1 0 0 1 1 0  39
0 0 1 0 0 0 0 0 0 0 0 0 1 0 1 1 1 1 1 1 0 0 1 1 0 0 0 0 0 0 0 0 1 1 1 0 0 1 1  40
```

*FIG. 5B*

HIGH-SPEED LONG CODE GENERATION WITH ARBITRARY DELAY

FIELD OF THE INVENTION

This invention relates to wideband code division multiple access (WCDMA) for a communication system and more particularly to a high-speed generator circuit for generating a Long Code an arbitrary delay.

BACKGROUND OF THE INVENTION

Present wideband code division multiple access (WCDMA) systems are characterized by simultaneous transmission of different data signals over a common channel by assigning each signal a unique code. This unique code is matched with a code of a selected receiver to determine the proper recipient of a data signal. Base stations in adjacent cells or transmit areas also have a unique pseudo-random noise (PN) code associated with transmitted data. This PN code or Long Code is typically generated by a Linear Feedback Shift Register (LFSR), also known as a Linear Sequence Shift Register, and enables mobile stations within the cell to distinguish between intended signals and interference signals from other base stations. Identification of a PN code requires the mobile station to correctly identify an arbitrary part of the received PN sequence. The identification is frequently accomplished by a sliding window comparison of a locally generated PN sequence with the received part of the PN sequence. The sliding window algorithm often requires the mobile station to efficiently calculate multiple offsets from the LFSR to match the received sequence.

In another application of an LFSR, the base station typically generates a PN sequence for the forward link by a combination of one or more LFSRs 100, 120 as in FIG. 1. The mobile unit is also generates a PN sequence for the reverse link with LFSR circuits 200, 220 as in FIG. 2. This PN sequence is used for quadrature phase shift keyed (QPSK) reverse link transmission. This transmission requires that the PN sequence be arbitrarily shifted by the number of chips equivalent to 250 microseconds for transmitting the in-phase component and the quadrature component. This arbitrary shift may vary with data rate.

The LFSR of FIG. 1 includes two 18-bit shift registers 100 and 120 operated by a clock signal (not shown) to continuously shift the register contents from left to right. A logic gate 110 receives signals from bit positions 0 and 7 of register 100 on leads 108 and 107, respectively, and produces an exclusive OR output signal on lead 102. The output signal is shifted into the most significant bit position (MSB) each clock cycle as the least significant bit (LSB) is shifted out on lead 104. Logic gate 130 receives signals from bit positions 0, 5, 7, and 10 of register 120 on leads 128, 122, 123, and 124, respectively, and produces an exclusive OR output signal on lead 126. The output signal is shifted into the MSB position each clock cycle as the LSB is shifted out on lead 116. Exclusive OR gate 112 receives the signals on leads 104 and 116 and produces a PN code on lead 114. The LFSR embodiment of FIG. 2 includes two 41-bit shift registers 200 and 220 operated in the same manner as the LFSR of FIG. 1. A logic gate 210 receives signals from bit positions 0 and 3 of register 200 on leads 208 and 207, respectively, and produces an exclusive OR output signal on lead 202. The output signal is shifted into the MSB position as the LSB is shifted out on lead 204. Logic gate 230 receives signals from bit positions 0 and 20 of register 220 on leads 228 and 222, respectively, and produces an exclusive OR output signal on lead 226. The output signal is shifted into the MSB position each clock cycle as the LSB is shifted out on lead 216. Exclusive OR gate 212 receives the signals on leads 204 and 216 and produces a PN code on lead 214. Although LFSRs of FIG. 1 and FIG. 2 efficiently generate long PN sequences, neither is readily adaptable to produce arbitrary offsets within their respective PN sequences.

Another application of an arbitrary offset LFSR arises for spreading and despreading transmitted signals as disclosed in U.S. Pat. No. 5,228,054 by Timothy I. Rueth and incorporated herein by reference. Rueth discloses an advantage of modulating each data bit at a constant chip rate for various transmit data rates. For example, a constant chip rate produces 128 chips for each bit at 9600 bits per second and 256 chips for each bit at 4800 bits per second. Thus, the chip rate may remain constant while the transmitted data rate may vary in response to rate information from a base station. Rueth further teaches that synchronization of base and mobile stations is simplified by inserting a zero in the PN sequence, thereby increasing the number of states from $2^N-1$ to $2^N$. Synchronization is further simplified by including an arbitrary offset circuit for the LFSR. Rueth teaches a mask circuit 30 in combination with an N-bit LFSR 10 (FIG. 2) for producing a PN offset with respect to the LFSR state. The mask circuit 30 produces the desired offset in response to a mask signal MASK on bus 32. Rueth gives a specific example of a particular mask signal for a 10-chip offset for an exemplary 4-bit LFSR (col. 7, lines 37–40). Rueth, however, fails to teach or suggest how the mask signal is generated for this specific case or how the mask signal might be generated for an LFSR of arbitrary length. Rueth states that "it would be simplest to implement if the paired values of OFFSET and MASK were pre-computed and stored in a Read Only memory (ROM) not shown." (col. 8, lines 63–66). For a 15-bit LFSR, however, this would require $2^N-2$ (32,722) 15-bit masks. A particular problem with generation of this mask signal, therefore, is the need for a simple circuit to generate states with an arbitrary offset from an LFSR state. Other problems include the practical memory limitation of mobile handsets, calculation complexity of offset determination and speed and power requirements to generate the offset.

SUMMARY OF THE INVENTION

These problems are resolved by a circuit designed with a first register circuit arranged to store a state matrix. A memory circuit is arranged to store a plurality of addressable matrices. A control circuit is coupled to receive a delay value and a clock signal. The control circuit is arranged to address a selected matrix from the plurality of addressable matrices in response to the delay value and the clock signal. A backward register circuit is coupled to receive the selected matrix. The backward register circuit is arranged to produce a plurality of shifted matrices from the selected matrix in response to the clock signal. A logic circuit is coupled to receive the state matrix, the selected matrix and the plurality of shifted matrices. The logic circuit produces a logical combination of the state matrix and each of the selected matrix and the plurality of shifted matrices.

The present invention produces a state vector with an arbitrary offset from an initial state vector with minimal power and gate delay. Memory storage requirements for companion matrices are minimized.

BRIEF DESCRIPTION OF THE DRAWINGS

A more complete understanding of the invention may be gained by reading the subsequent detailed description with reference to the drawings wherein:

FIG. 5A is a companion matrix of order 1 corresponding to the register circuits of FIG. 4A–4B;

FIG. 5B is a companion matrix of order 1024 corresponding to the register circuits of FIG. 4A–4B;

DETAILED DESCRIPTION OF THE PREFERRED EMBODIMENTS

Figure 1:
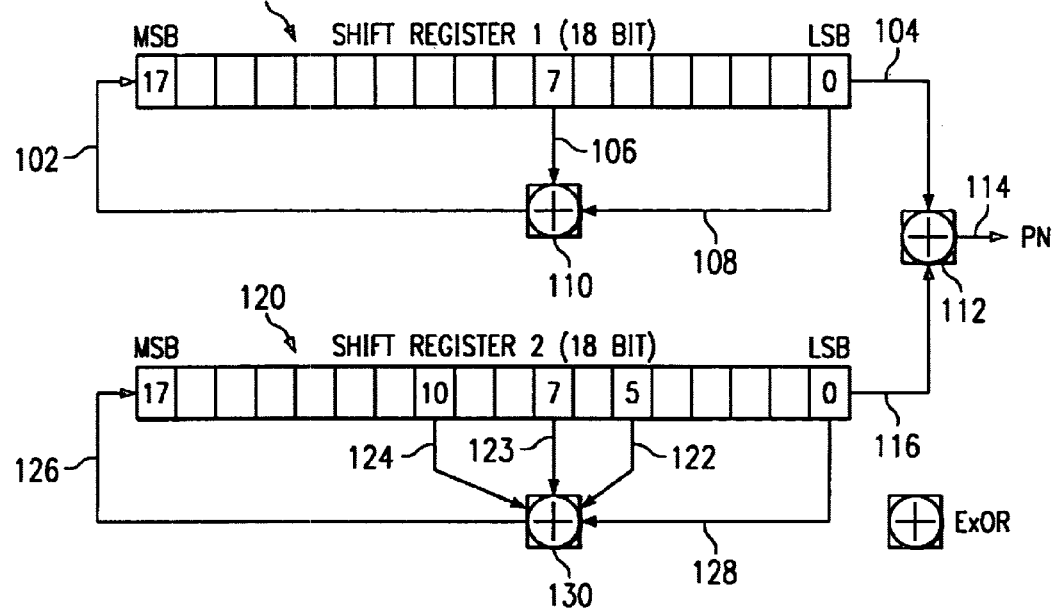
FIG. 1 is a simplified block diagram of a linear feedback shift register of the prior art.
Figure 2:
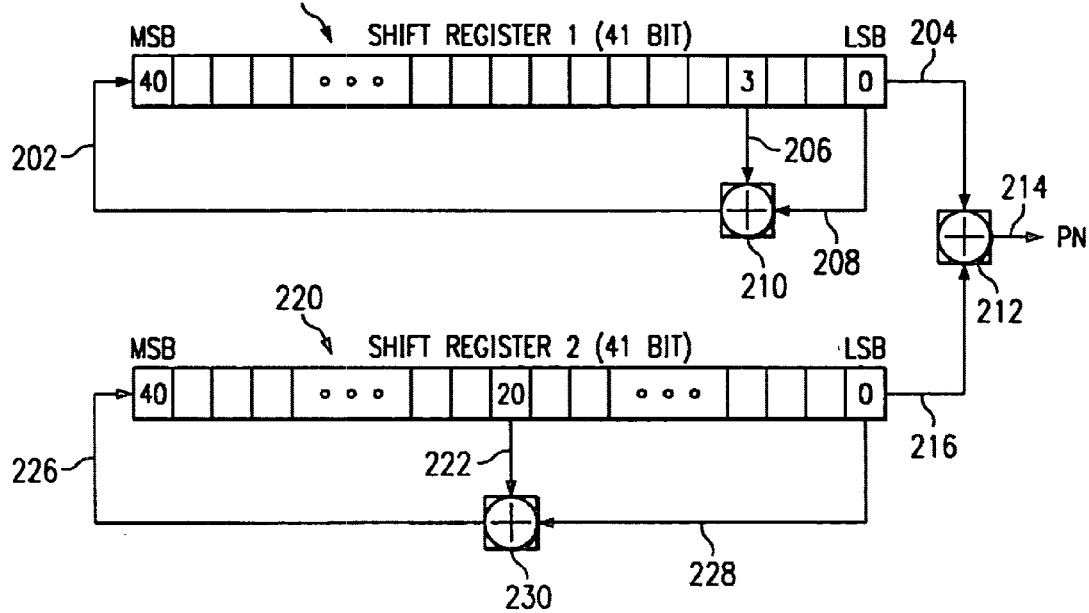
FIG. 2 is a simplified block diagram of another linear feedback shift register of the prior art.
Figure 3:
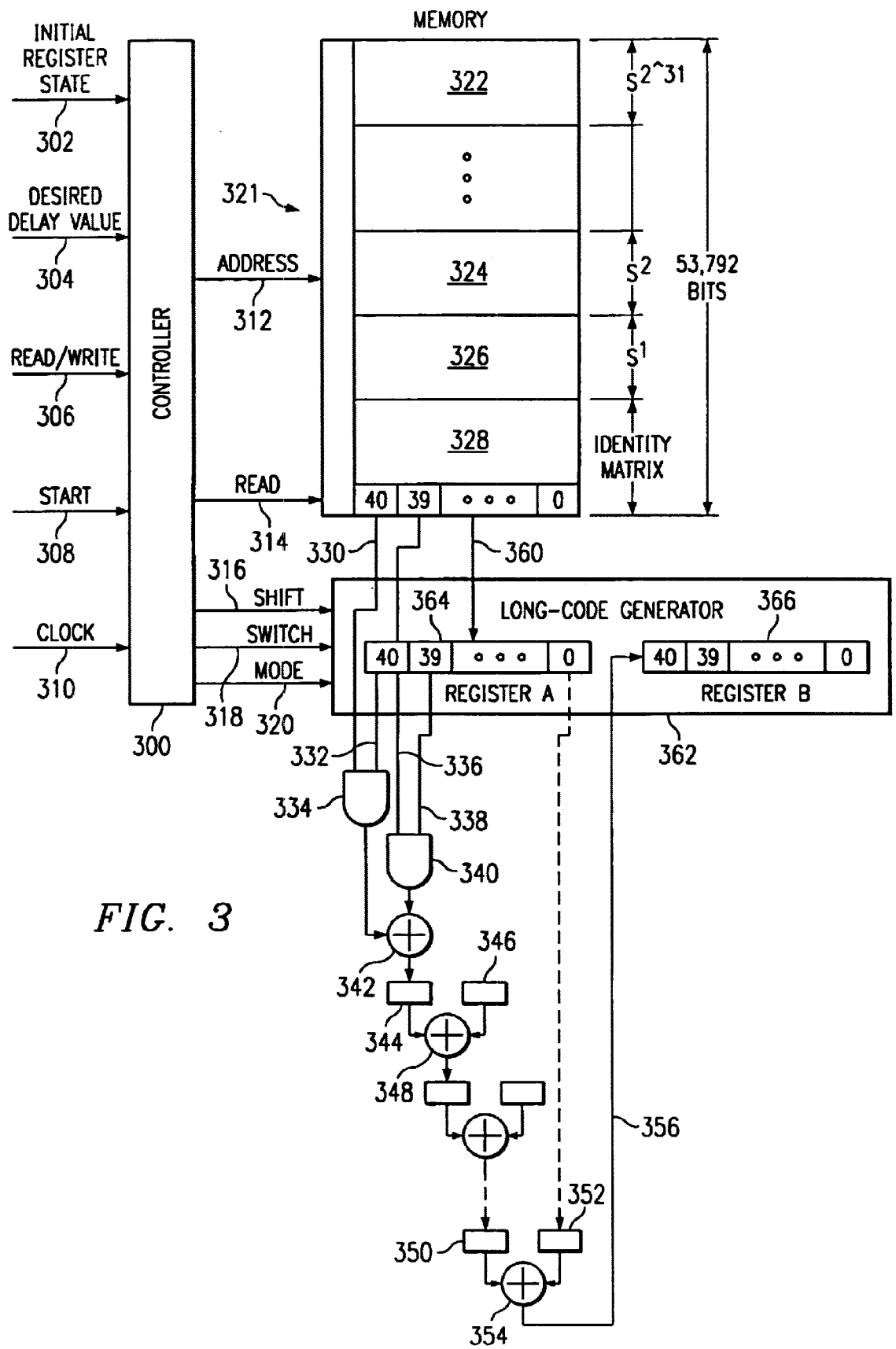
FIG. 3 is a block diagram of a PN generator circuit of the present invention.

Referring to FIG. 3, there is a block diagram of a PN generator circuit of the present invention that may be used to generate a PN sequence corresponding to a 41-bit LFSR 220 (FIG. 2). The 41-bit LFSR has $2^N-1$ or approximately $2.2 \times 10^{12}$ states. The PN generator circuit includes a control circuit 300 coupled to receive an initial state matrix on bus 302, a delay value on bus 304, a read/write signal on lead 306, a start signal on lead 308 and a clock signal on lead 310. The control circuit produces an address for selecting companion matrioes 322–328 designated $S^{2^{31}}-S^1$ and an identity matrix, respectively, from the memory circuit 321 via address bus 312. The control circuit also produces control signals on leads 316–320 for controlling operation of the Long-Code Generator 362. An input register circuit 364 is coupled to receive the initial state matrix or vector on bus 360, A logic circuit, including AND gates 334 and 340, exclusive-OR (XOR) gates 342, 348 and 354 and latch circuits 344, 346, 350 and 352, is coupled to the memory circuit and the register circuit. Output register circuit 366 is arranged to store a PN sequence of output signals on lead 356.

In operation, the output of the logic circuit is a logical combination of the initial state matrix and the stored companion matrix. This logical combination is preferably a modulo 2 matrix multiplication for producing a state matrix or vector that is delayed from the initial state matrix by the delay value. In general, this new state $S_n$ is determined by equation [1].

$$S_n = M^n S_0 \quad [1]$$

The state matrix $S_n$ is delayed from initial state matrix $S_0$ by n states of the PN sequence. The companion matrix $M^n$ is an initial companion matrix $M^1$ raised to the power n. This companion matrix has a form determined by the PN sequence polynomial as will be explained in detail. A maximum length of the delay value is determined by a practical need for only the first $2^{32}$ bits of the total PN sequence, although the concept of the present invention may be extended to any N-bit delay value for a corresponding N-stage LFSR. The 32-bit delay value on bus 304 may be represented in binary form as shown in equation [2].

$$n = a_{31} \times 2^{31} + a_{30} \times 2^{30} + \ldots a_0 \times 2^0 \quad [2]$$

A companion matrix for producing an arbitrary offset n from initial state So is then represented by equation [3].

$$M^n = (M^{2^{31}})^{a_{31}} \times (M^{2^{30}})^{a_{30}} \times \ldots \times (M^{2^0})^{a_0} \quad [3]$$

Any companion matrix having an arbitrary n exponent, therefore, may be calculated by storing the matrices of equation [3] in memory circuit 321. Any zero-value bit of the delay value on bus 304 selects the identity matrix at memory circuit 328. Alternatively, any one-value bit of the delay value on bus 304 selects a corresponding companion matrix from matrix circuit 322–326. The initial state matrix or vector is loaded into input register circuit 364 in response to a READ signal on lead 314. The control circuit addresses each successive row of a selected companion matrix in response to the clock signal and the shift signal on lead 316. Each addressed row in then multiplied by the state vector in input register circuit 364 in response to the mode signal on lead 320, preferably by modulo-2 matrix multiplication. Logical AND gates, for example AND gates 334 and 340, are coupled to receive respective input bits 40 and 39 on leads 330, 332, 336, and 338. The AND gates produce a logical AND of corresponding bit positions of the selected companion matrix row and the state vector. These logical AND output signals are combined by XOR gate 342 and latched by latch circuit 344 in parallel with other bit positions in response to the clock signal. The control circuit addresses the next row of the companion matrix after the first modulo-2 product is latched and repeats the multiplication with the state matrix in input register circuit 364. This process continues, and the tree structure of latches and XOR gates combines all the bit positions on successive clock cycles to produce a PN sequence on lead 356. Each bit of this PN sequence is stored in output register circuit 366. The matrix products continue to propagate through the pipeline of the logic circuit until all bit positions of output register circuit 366, corresponding to the 41 rows of the selected companion matrix, are filled The control circuit then produces a switch signal on lead 318 to exchange input register circuit 364 with output register circuit 366. Thus, register circuit 366 becomes the input register circuit and register circuit 364 becomes the output register circuit. The matrix multiplication then resumes with the next selected companion and the previous matrix product in register circuit 366. After 32 matrix multiplication operations, the delayed state vector resides in output register circuit 364.

This circuit is highly advantageous for efficiently producing a state vector having an arbitrary delay with respect to an initial state vector. Memory requirements are greatly reduced by storing only exponentially weighted matrices rather than the matrices for each desired offset. Moreover, computation time and power are minimized by use of combinatorial logic for modulo-2 matrix multiplication.

Figure 4A:
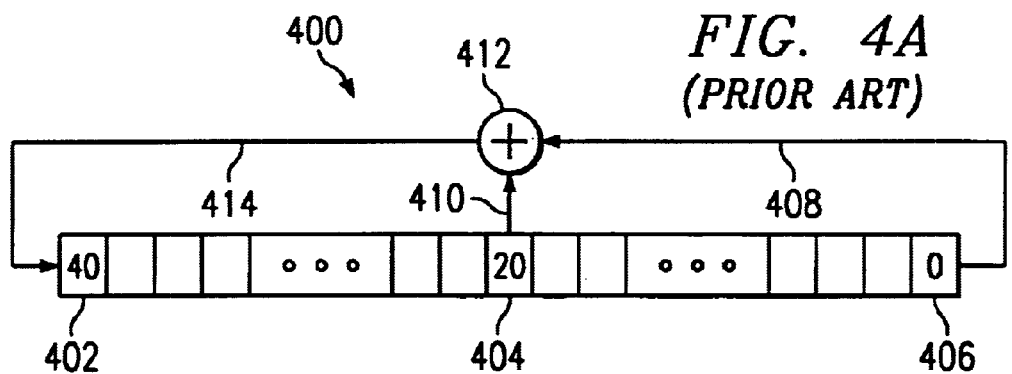
FIG. 4A is a diagram of a forward LFSR of the prior art.

Referring now to FIG. 4A, there is an exemplary 41-bit LFSR 400 of the prior art for producing a PN polynomial as in equation [4]. The LFSR includes a gate 412 coupled to receive input bits 20 (404) and 0 (406) on leads 410 and 408, respectively. The gate 412 produces an exclusive OR output signal on lead 414 that is applied to bit 40 (402). The initial companion matrix M is a 41×41 square matrix having the form of equation [5] corresponding to the 41-stage LFSR of FIG. 4A. The left column of the initial companion matrix includes zero elements $t_{0,0}-t_{39,0}$ and a one in element $t_{40,0}$. The I of equation [5] indicates a 40×4 square identity matrix having ones from the upper-left $t_{0,1}$ element along the diagonal to the lower-right $t_{39,40}$ element and zeros elsewhere. The 40-element vector c corresponds to coefficients $c_1-c_{40}$ of the PN polynomial of equation [4] in elements $t_{40,1}-t_{40,40}$. The value of vector c, therefore, has all zero values except for the one of element $c_{20}$ corresponding to the feedback tap 410. By way of illustration, this initial companion matrix M is shown at FIG. 5A with a one of element $t_{40,20}$ corresponding to element $c_{20}$ in column 20 of row 40.

In general, the form of this initial companion matrix M remains the same for any N-length LFSR as in FIG. 4A, and the vector c with a length N-1 is determined by the location of the feedback taps such as lead 410.

$$M = \begin{bmatrix} 0 & I \\ 1 & c \end{bmatrix} \quad [5]$$

Figure 4B:
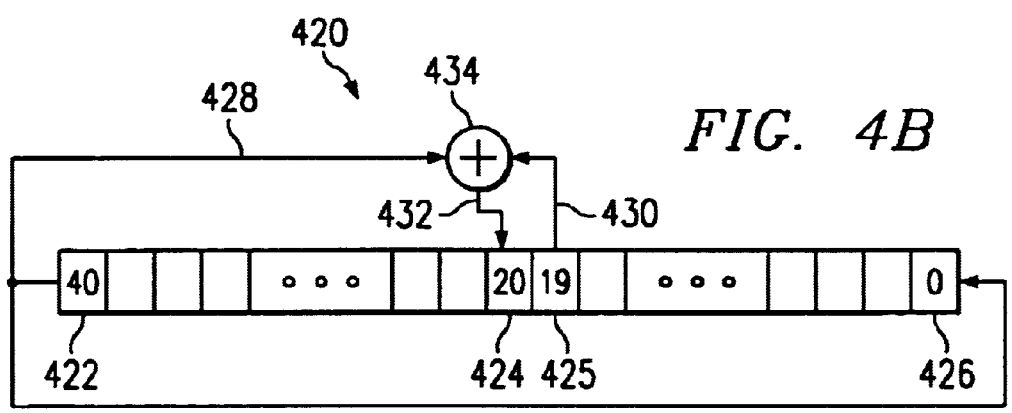
FIG. 4B is a diagram of a backward register circuit of the present invention.

Turning now to FIG. 4B, there is a backward register circuit 420 of the present invention. The register circuit may be a shift register, a circular buffer or other memory circuit as will be apparent to those of ordinary skill in the art having access to the instant specification. Operation of the backward register circuit will be explained in detail with reference to the companion matrix of FIG. 5B having an exemplary order 1024. The backward register circuit corresponds to the LFSR configuration of FIG. 4A, but may be applied to any LFSR configuration. The backward register circuit includes 41 bit positions with tap leads 430 and 432. In general, this correspondence between backward register taps 424 and 425 and LFSR tap 410 (FIG. 4A) is applicable for generation of any PN polynomial.

In operation, the backward register circuit 420 is loaded with only the top row of the companion matrix of FIG. 5B in response to a clock signal. The next clock signal shifts all bits of the backward register one position to the left with the exception of bit positions 19 and 20. The bit at position 40 shifts to bit position 0 on lead 428. Furthermore. XOR gate 434 combines the bit at position 40 (422) with the bit at position 19 (425) and loads the result into bit position 20 (424). This backward shift process generates the next row of the companion matrix of FIG. 5B. For example, if the backward register is initially loaded with row 0, a clock signal causes an XOR of the one in column 40 with the zero of column 19 to produce the one of column 20 in row 1. Furthermore, the one in column 40 of row 0 is shifted to column 0 of row 1 by shifting bit 40 (422) into bit 0 (426). This operation of generating each row is repeated with every clock cycle, thereby generating the entire companion matrix of FIG. 5B from row 0. This circuit is highly advantageous in conserving memory area Only 41 bits are stored for each companion matrix rather than 41×41 bits. Since each row is generated within a single clock cycle, there is no speed or power penalty.

Figure 6:
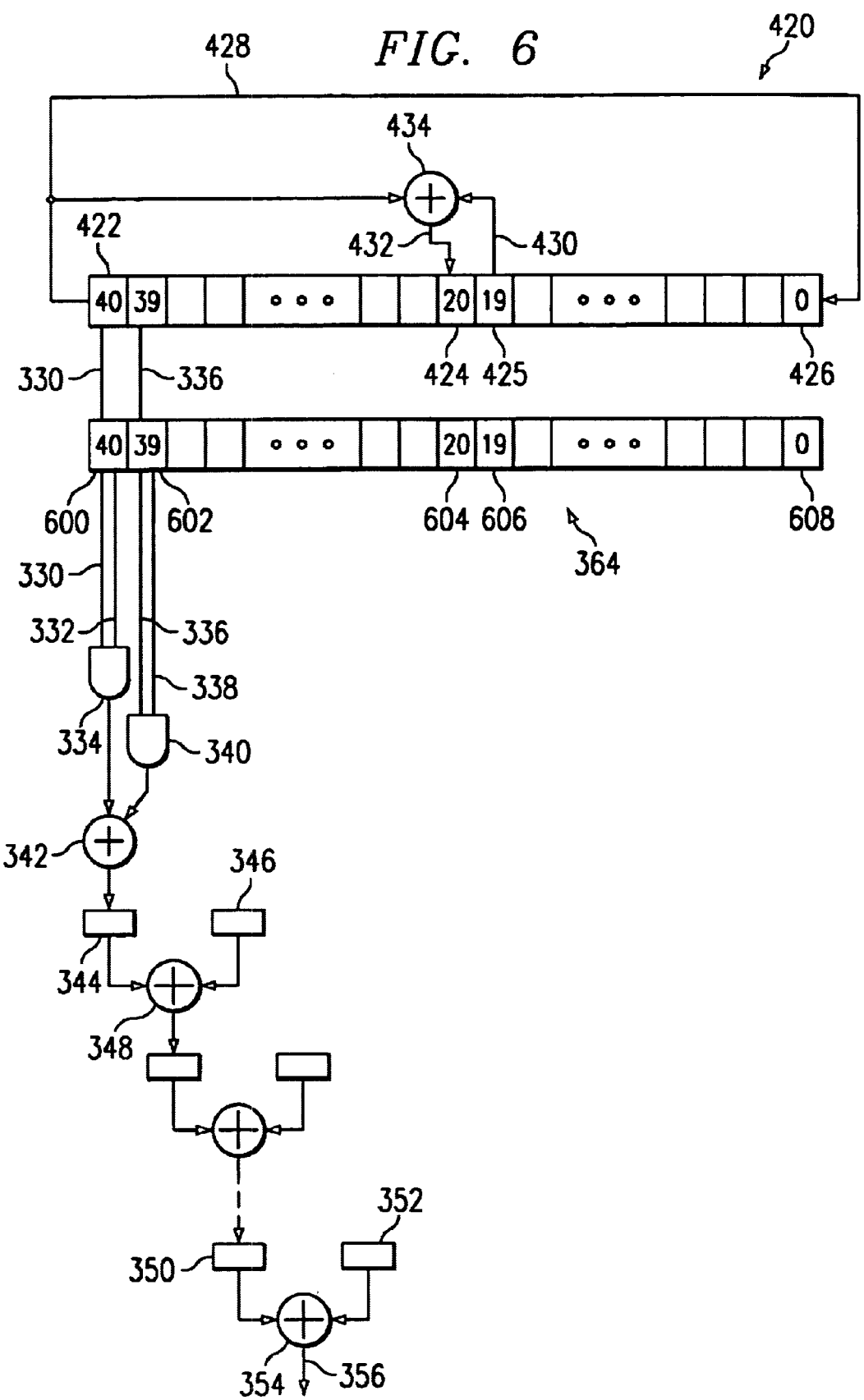
FIG. 6 is a schematic diagram of a backward register circuit, a state register circuit and a logic circuit for generating a pseudorandom noise sequence.

Referring now to FIG. 6, there is an embodiment of the present invention including the backward register circuit of FIG. 4B. The same reference numerals are used to indicate previously described elements. Backward register circuit 420 and register circuit 364 are coupled to the logic circuit represented by AND gates 334 and 340, XOR gate 342 and latch circuit 344. Both register circuits have an equal length and are operated synchronously by a clock signal (not shown). The backward register circuit is initially loaded with the top row of the companion matrix (FIG. 5B). Register circuit 364 is loaded an initial state vector. Each bit of backward register circuit 420 is combined with each corresponding bit of register circuit 364 by a respective AND gate. For example, bit 40 (422) is combined with bit 40 (600) by AND gate 334. Sit 39 (336) is combined with bit 39 (602) by AND gate 340. Likewise, all other bits of registers 420 and 364 including bits 20 (424), 19 (425), and 0 (426) are combined with bits 20 (604), 19 (606), and 0 (608). Output signals from AND gates 334 and 340 are applied in parallel with other AND gate output signals to respective XOR gates, for example, XOR gate 342. The output signal from XOR gate 342 is then latched by latch 344. The next clock signal shifts the contents of backward register 420 as previously described, thereby generating the next row of the companion matrix for modulo-2 multiplication with the state vector in register circuit 364.

Figure 7:
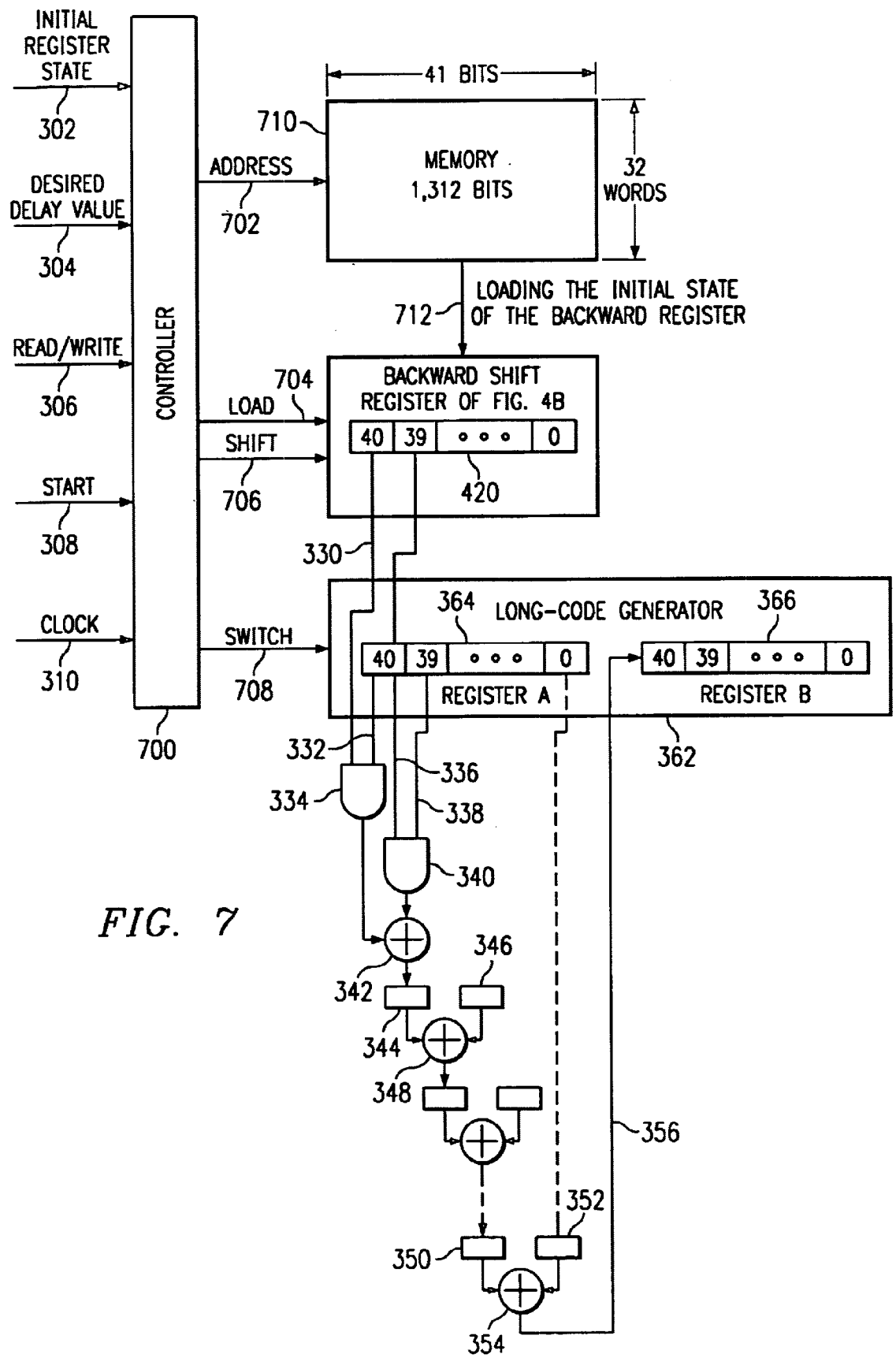
FIG. 7 is a block diagram of a high-speed PN generator circuit of the present invention including the embodiment of FIG. 6.

The PN generator circuit of FIG. 7, including the backward register circuit of FIG. 6, will now be explained in detail. The same reference numerals are used to indicate previously described elements. Memory circuit 710 is loaded with a predetermined 41-bit first row of each of 32 companion matrices of equation [3]. This exemplary memory circuit, therefore, requires only 32.41-bit words or 1,312 bits of memory. The control circuit 700 loads the initial state vector on bus 302 into input register 364 in response to the start signal. The control circuit 700 addresses the first selected one-row matrix in response to the address on bus 702 produced by the delay value on bus 304 and the clock signal. The control circuit further generates a load signal on lead 704 to load the backward register circuit 420 with this selected row via bus 712. The logic circuit, including for example, AND gates 334 and 340, produces a logical AND of corresponding bit positions of the selected companion matrix row and the state vector. These logical AND output signals are combined by XOR gate 342 and latched by latch circuit 344 in parallel with other bit positions in response to the clock signal. The control circuit applies a shift signal on lead 706 to the backward register circuit 420 to generate the next companion matrix row for multiplication with the state vector in input register circuit 364. This process continues, and the tree structure of latches and XOR gates combines all the bit positions on successive clock cycles to produce the PN sequence on lead 356. This PN sequence is stored in output register circuit 366. The matrix products continue to propagate through the pipeline of the logic circuit until all bit positions of output register circuit 366 are filled The control circuit then produces a switch signal on lead 708 to exchange input register circuit 364 with output register circuit 366. The control circuit then selects a first row of a next companion matrix for loading into the backward register circuit. Matrix multiplication then resumes with this selected row and the previous matrix product in input register circuit 366. This process continues with PN sequence bits being stored in output register 364. After an even number of 32 matrix multiplication operations, the delayed state vector resides in output register 364.

This circuit is highly advantageous for efficiently producing a state vector having an arbitrary delay with respect to an initial state vector. Memory requirements are greatly reduced by storing only a first row of each companion matrix rather than each entire companion matrix. This requires only 1,312 bits of memory rather than the 53,792 bits of the embodiment of FIG. 3. Moreover, computation time and power are minimized by use of combinatorial logic for the backward register circuit and for modulo-2 matrix multiplication.

Although the invention has been described in detail with reference to its preferred embodiment, it is to be understood that this description is by way of example only and is not to be construed in a limiting sense. For example, previously described techniques for generating a delayed state matrix may be used to generate an arbitrary delay with respect to any state matrix or vector. Moreover, two backward register circuits might be combined to multiply two square matrices rather than a matrix and a vector.

It is understood that the inventive concept of the present invention may be embodied in a mobile communication system as well as circuits within the mobile communication system. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A circuit, comprising:
   a first register circuit arranged to store a state matrix;
   a memory circuit arranged to store a plurality of addressable matrices;
   a control circuit coupled to receive a delay value and a clock signal, the control circuit arranged to address a plurality of selected matrices from the plurality of addressable matrices in response to the delay value and the clock signal; and
   a logic circuit coupled to receive the state matrix and a selected matrix from the plurality of selected matrices, the logic circuit arranged to produce a logical combination of the state matrix and the selected matrix.

2. A circuit as in claim 1, wherein the logical combination is a pseudorandom noise sequence.

3. A circuit as in claim 2, wherein the state matrix is an N-length vector and each of the addressable matrices is an N×N matrix.

4. A circuit as in claim 3, wherein the logic circuit further produces a logical combination of the state matrix and the plurality of selected matrices.

5. A circuit as in claim 2, wherein a modulo 2 product of each row of the selected matrix and the state matrix is an element of another state matrix and wherein at least one element of said another state matrix is a pseudorandom number of the pseudorandom noise sequence.

6. A circuit as in claim 5, wherein the logic circuit comprises a combinatorial logic circuit arranged to produce the modulo 2 product.

7. A circuit as in claim 1, further comprising a second register circuit, wherein the logical combination comprises a plurality of elements, each element including a product of a respective row of the selected matrix and the state matrix and wherein the second register circuit is arranged to store each element of the plurality of elements in response to the clock signal.

8. A circuit as in claim 7, wherein the control circuit exchanges respective functions of the first and second register circuit after the product of each said respective row and said state matrix is determined.

9. A circuit as in claim 1, wherein the memory circuit comprises a backward register circuit and wherein the addressable matrices are N-length vectors, the backward register circuit arranged to produce the selected matrix having N×N size.

10. A circuit, comprising:
    a first register circuit arranged to store a state matrix;
    a memory circuit arranged to store a plurality of addressable matrices;
    a control circuit coupled to receive a delay value and a clock signal, the control circuit arranged to address a selected matrix from the plurality of addressable matrices in response to the delay value and the clock signal;
    a second register circuit coupled to receive the selected matrix, the second register circuit arranged to produce a plurality of shifted matrices from the selected matrix in response to the clock signal; and
    a logic circuit coupled to receive the state matrix, the selected matrix, and the plurality of shifted matrices, the logic circuit arranged to produce a logical combination of the state matrix and at least one of the selected matrix and the plurality of shifted matrices.

11. A circuit as in claim 10, wherein the logical combination is a pseudorandom noise sequence.

12. A circuit as in claim 11, wherein the state matrix is an N-length vector and each of the addressable matrices is an N-length vector.

13. A circuit as in claim 12, wherein the selected matrix and the plurality of shifted matrices comprise a companion matrix.

14. A circuit as in claim 13, wherein each of the selected matrix and the plurality of shifted matrices is a row of the companion matrix.

15. A circuit as in claim 14, wherein a modulo 2 product of each row of the companion matrix and the state matrix is an element of another state matrix and wherein at least one element of said another state matrix is a pseudorandom number of the pseudorandom noise sequence.

16. A circuit as in claim 15, wherein the logic circuit comprises a combinatorial logic circuit arranged to produce the modulo 2 product.

17. A circuit as in claim 12, wherein the second register circuit is a backward register circuit.

18. A circuit as in claim 10, further comprising a third register circuit arranged to store a plurality of elements of the logical combination of the state matrix and each of the selected matrix and the plurality of shifted matrices, each element including a product of the state matrix and a respective row of one of the selected matrix and the plurality of shifted matrices, wherein the third shift register is arranged to store each element in response to the dock signal.

19. A circuit as in claim 18, wherein the control circuit exchanges respective functions of the first and third shift register after the product of each said the state matrix and said respective row of one of the selected matrix and the plurality of shifted matrices.

20. A method of producing a pseudorandom sequence for a mobile communications system comprising the steps of:
    storing a state vector;
    storing a plurality of rows, each row corresponding to a different respective matrix:
    selecting a current row from the plurality of rows;
    multiplying the current row by the state vector to produce an element;
    storing the element;
    shifting the current row to produce a next current row; and
    repeating the multiplying, storing and shifting steps for each row of said different respective matrix;
    wherein the step of storing further comprises the step of storing each said element in a register circuit in response to a clock signal.

* * * * *